United States Patent Office 2,824,017
Patented Feb. 18, 1958

2,824,017

FILM-FORMING COMPOSITION WITH A TEREPHTHALAMIDE ESTER PLASTICIZER

Ralph T. K. Cornwell, Rosemont, Pa., assignor to American Viscose Corporation, Philadelphia, Pa., a corporation of Delaware No Drawing. Application July 29, 1955
Serial No. 525,349

6 Claims. (Cl. 106—180)

This invention relates to novel compositions of matter comprising a film-forming polymer and a plasticizer consisting of an ester of terephthalamide. This application is a continuation-in-part of my application Serial No. 333,617, filed January 27, 1953, now abandoned, which in turn is a continuation-in-part of my application Serial No. 135,835, filed December 29, 1949, now abandoned, which in turn is a continuation-in-part of my application Serial No. 75,965, filed February 11, 1949, now abandoned.

The plasticizers of the present invention have the following generic formula:

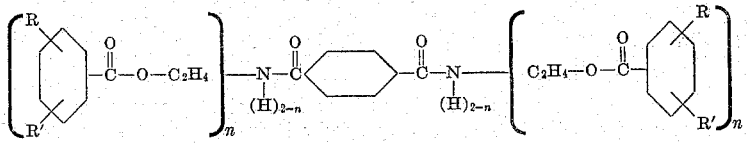

where $n$ is an integer having a value from 1 to 2 and R' and R'' are selected from the group consisting of hydrogen, halogen and lower alkyl groups having from 1 to 6 carbon atoms and may be the same or different.

These compounds have been prepared and found to be white crystalline solids useful as plasticizers for high polymers. They may be prepared as follows: Monoethanolamine or di-ethanolamine is heated with a terephthalic acid or a terephthalic acid ester, such as diethyl terephthalate, in ethyl alcohol until a clear solution of the reactants is obtained. The reaction product, N,N'-bis-(beta-hydroxyethyl)-terephthalamide or N,N'-tetra-(beta-hydroxyethyl)-terephthalamide, is removed from the solution and further reacted with aromatic acyl halides to produce the corresponding ester thereof. For example, the mixture of reactants in ethyl alcohol may be heated until a clear solution is obtained and the heating continued until all of the alcohol has been removed, usually 4 to 6 hours, or the clear solution allowed to stand for about 12 hours, at room temperature until the reaction product crystallizes. The product is then reacted with an aromatic acyl halide to produce the ester. Any aromatic acyl halide may be used, such as benzoyl chloride, phenylacetyl chloride, and halogen and/or alkyl substituted derivatives of up to 7 carbon atoms, such as p-ethylbenzoyl chloride, p-bromo-benzoyl chloride, m-chlorobenzoyl chloride, 2-bromo-4-methyl benzoyl chloride, 3-chloro-4-hexyl benzoyl bromide, 4-iodo-2-butyl benzoyl iodide, 2,5-dichloro-benzoyl chloride, 3-ethyl-5-amyl-benzoyl fluoride, etc.

The following examples illustrate preferred methods for the preparation of terephthalamide derivatives of the present invention.

EXAMPLE I

*Dibenzoate of N,N'-bis-(beta-hydroxyethyl)-terephthalamide*

The terephthalamide (0.025 mole) was dissolved in 135 cc. of pyridine at a slight boil. Benzoyl chloride (0.054 mole) was added slowly over a period of two hours while boiling. Refluxing at the boil was continued for another hour. The reaction mixture was then diluted with a liter of ice water. Light tan crude crystals with a melting point of 195–200° C. were recovered in 94.4 percent yield. The crude crystals were recrystallized twice from boiling ethanol to give a white crystalline product, melting point 211° C., in 85.3 percent yield. The product was insoluble in water, ethanol, butanol, n-hexane, 1,4-dioxane, cyclohexane, ethyl acetate and ethyl ether and soluble in hot acetone, toluene, benzene, chloroform and at ordinary temperature in pyridine. The product ($C_{26}H_{24}O_6N_2$) analyzed as follows:

Theory: C, 67.81; H, 5.25; N, 6.09
Found: C, 67.57; H, 5.36; N, 5.95

EXAMPLE II

*Di-(m-chlorobenzoate) of N,N'-bis-(beta-hydroxyethyl)-terephthalamide*

The terephthalamide (0.02 mole) was dissolved in 135 cc. of pyridine at a slight boil. m-Chlorobenzoyl chloride (0.041 mole) was added slowly over a period of two hours. Refluxing at the boil was continued for another half hour. The reaction mixture was then diluted with one liter of ice water. Light tan crystals with a melting point of 170–175° C. were recovered in 87.7 percent yield. The crude crystals were recrystallized twice from boiling ethanol to give a white crystalline product, melting point 188° C., in 75.7 percent yield. The product was insoluble in water, ethanol, butanol, n-heptane, toluene, benzene, 1,4-dioxane, cyclohexane, ethyl acetate and ethyl ether and was soluble in hot acetone, toluene, benzene, chloroform, 1,4-dioxane and at ordinary temperatures in pyridine. The product ($C_{26}H_{22}O_6N_2Cl_2$) analyzed as follows:

Theory: C, 58.99; H, 4.19; N, 5.29
Found: C, 55.76; H, 4.15; N, 5.29

EXAMPLE III

*Tetrabenzoate of N,N'-tetra-(beta-hydroxyethyl)-terephthalamide*

The terephthalamide (0.044 mole) was dissolved in 125 cc. pyridine at a slight boil. Benzoyl chloride (0.192 mole) was added slowly over a period of 1½ hours while refluxing at the boil. Refluxing was continued for an additional hour. The pyridine was then distilled off under vacuum. The resultant material was washed repeatedly with cold water and hot ether. A light brown resin-like material with a softening point of 52° C. was obtained in approximately 70 percent yield. The product was the formula $C_{44}H_{40}O_{10}N_2$. This product is insoluble in water, n-hexane, n-heptane, cyclohexane and ethyl ether, slightly soluble in ethanol, butanol, benzene, toluene, chloroform, 1,4-dioxane, ethyl acetate and soluble in acetone, pyridine and hot ethyl acetate, 1,4-dioxane, chloroform, benzene and toluene.

EXAMPLE IV

*Tetra-(m-chlorobenzoate) of N,N'-tetra-(beta-hydroxyethyl)-terephthalamide*

The terephthalamide (0.044 mole was dissolved in 125 cc. of pyridine at a slight boil. m-Chlorobenzoyl chloride (0.189 mole) was added slowly over a period of 1½ hours, and refluxing was continued for another hour. The pyridine was distilled off under vacuum and the resultant material was washed repeatedly with cold water and hot ether. A light brown resin-like material with a softening point of 59° C. was obtained in 78 percent yield. The product was the formula $C_{44}H_{36}O_{10}N_2Cl_4$. This product is insoluble in water, n-hexane, benzene, toluene, ethyl acetate, ethyl ether and cyclohexane, slightly soluble in ethanol, butanol, 1,4-dioxane and hot n-hexane, benzene, toluene and cyclohexane and soluble in acetone, chloroform, pyridine and hot ethanol and 1,4-dioxane.

EXAMPLE V

*Di-(p-ethylbenzoate) of N,N'-bis-(beta-hydroxyethyl)-terephthalamide*

The terephthalamide (0.044 mole) was dissolved in 130 cc. of pyridine at a slight boil. p-Ethyl benzoyl chloride (0.09 mole) was added slowly over a period of two hours and refluxing was continued for an additional hour. The pyridine was distilled off under vacuum and the resultant material was washed repeatedly with cold water and hot ether. The crude crystals were recrystallized twice from boiling ethanol to give a crystalline product.

EXAMPLE VI

*Diphenylacetate of N,N'-bis-(beta-hydroxyethyl)-terephthalamide*

The terephthalamide (0.039 mole) was dissolved in 130 cc. of pyridine at a slight boil. Phenylacetyl chloride (0.07 mole) was added slowly over a period of two hours and refluxing was continued for an additional hour. The pyridine was distilled off under vacuum and the resultant material was washed repeatedly with cold water and hot ether. After recrystallization there remains a crystalline product.

These esters may be used as plasticizers and coating agents for cellulosic films and sheets. For example, they may be employed as the plasticizer in moistureproofing and/or heat-sealing coatings for cellophane such as those described in my Patents 2,487,105 and 2,487,106. Other film-forming materials which may be plasticized by the dipropionate of the present invention include (1) thermoplastic resins such as polyvinyl chloride, polyvinylidene chloride, polystyrene, copolymers of vinyl chloride and vinyl acetate, copolymers of methyl methacrylate and vinyl chloride, polyvinyl butyral, polyvinyl acetal, polymethyl methacrylate, polymethyl acrylate, polyethylene, polyamides, natural rubbers, synthetic rubbers; chlorinated rubber, polysulfides, poly-isobutylenes, cyclized rubber, rubber hydrochloride, buna rubber, coumaroneindene with rubber, oil-modified and unmodified alkyd resins prepared from dihydroxy alcohols and dicarboxylic acids, phenolformaldehyde resins prepared from phenols having only two reactive positions (2) thermoplastic cellulose compounds such as cellulose acetate, cellulose acetate butyrate, cellulose acetate propionate, cellulose propionate, benzyl cellulose, ethyl cellulose, butyl cellulose, hydroxyethyl cellulose, cellulose nitrate, mixed esters or ether-esters such as cellulose acetate-nitrate, cellulose acetate-propionate or ethyl cellulose-nitrate, (3) such thermosetting resins as urea-formaldehyde, phenol-formaldehyde (phenols having three reactive positions), melamine-formaldehyde, alkyd resins prepared from polyhydric alcohols and polycarboxylic acids, phenolfurfural, unsaturated polyesters, polyallyl alcohol and derivatives, protein-formaldehyde resins such as casein-formaldehyde and shellac-formaldehyde and (4) mixtures of thermoplastic and thermosetting resins such as polyvinyl chloride and urea-formaldehyde-butanol ether, polyvinyl chloride and phenol-formaldehyde, polymethacrylate and urea-formaldehyde, polystyrene and alkyd, coumarone-indene and alkyd, polyvinyl acetal and melamine-formaldehyde. In such compositions, the film-forming material may be present in a proportion of 40 to 95% by weight of the total solids in the composition, and the dipropionate of the present invention may be present in a proportion of 5 to 45% by weight of the total solids.

While it is an advantage of the present plasticizers that they possess solvent powers for so many plastic components that they can normally be used as the only plasticizer, the invention is by no means limited to plastic compositions in which it is the only plasticizer present. On the contrary, it may be associated with other plasticizers such, for example, as dibutyl phthalate, dilauryl phthalate, cyclohexyl butyl phthalate, di(methylcyclohexyl) phthalate, di(dimethylcyclohexyl) adipate, dicyclohexyl adipate, tricresyl phosphate, esters of o-benzoyl benzoic acid such as butyl benzoyl benzoate derivatives of toluene sulfonamide, or the like.

As moistureproofing agents, waxes or wax-like material such as paraffin, petrolatum, ceresin, japan wax, palm wax, beeswax, certain chlorinated hydrocarbons, Chinese insect wax, or other synthetic waxes or wax-like materials may be used. If some of these waxes are too soft for the purpose desired, they may be mixed with harder waxes of the group or with carnauba wax, candelilla wax or other harder waxes. Generally, paraffin serves as a satisfactory moistureproofing agent which may be hardened, if necessary, by admixture with carnauba wax or candelilla wax.

In the preparation of moistureproofing coating compositions comprising a cellulose derivative and a moistureproofing agent, it is advantageous to include some material which will improve the compatibility of these two ingredients. This material is referred to as a blending agent and is usually of a resinous nature, although this is not absolutely necessary. When the blending agent is resinous, advantage may be taken of its film-forming characteristics, if any, and sufficient quantity may be added to a coating composition to contribute towards the body and build of that composition in addition to the blending action. Depending on the nature of the blending agent, more or less plasticizing action on the cellulose derivative may be obtained.

As the blending agents, any of the natural or synthetic resins commonly available may be used so long as they are compatible and form homogeneous mixtures. Such resins may include ester gum, rosinates, hydrogenated rosin, hydrogenated rosin esters, dammar, copal, kauri, alkyd resins, vinyl derivatives, chlorinated diphenyl resins, and soluble resins of the phenol-formaldehyde type. Non-resinous blending agents may be used when they yield homogeneous mixtures and these may include hydrogenated castor oil, castor oil phthalate, lanolin or wool grease, ethyl abietate, methyl abietate, diethylene glycol rosinate, diethylene glycol hydrorosinate, or the like.

It is the most convenient to apply the above lacquer and moistureproofing coating compositions to base materials, such as sheets of regenerated cellulose, by means of suitable solvents. Thus, the film-forming ingredients may be dissolved to give a coating solution of an appropriate viscosity and solids content, whereupon the solution may be applied to the desired base in accordance with the methods know in the art. The solvents may be removed and the coated base subjected to an elevated temperature at least equal to the melting point of the wax, whence, after cooling, a clear, transparent moistureproof, coated base will be obtained.

These moistureproofing compositions may be applied to various sheet material to produce wrapping tissues which are flexible, moistureproof and heat-sealable and which exhibit highly improved surface characteristics including excellent surface slip and resistance to caking, sticking, or marring during storage. A variety of base sheet materials may be used, such as cellulosic materials, paper, albuminous materials (gelatin, agar-agar, casein), or films made from rubber derivatives, that is, rubber hydrochloride, chlorinated rubber, or the material prepared by reacting rubber and a metal halide such as boron trifluoride, stannous or stannic chloride, stannic acid, and other materials. In the preferred embodiment of the invention, a non-porous, non-fibrous, dense, smooth surfaced, and preferably transparent material such as regenerated cellulose, cellulose ester films including cellulose nitrate and cellulose acetate, or cellulose ether films including ethyl cellulose, benzyl cellulose, glycol cellulose, or lowly etherified cellulose such as those in which there is any one substituent group for several glucose units of cellulose, is employed. In such compositions, the film-forming material may be present in a proportion of 40 to 95 percent by weight of the total solids in the composition, and the compounds of the present invention may be present in a proportion of 5 to 45 percent by weight of the total solids.

The following examples show the use of the esters of the present invention as plasticizers in lacquers useful for coating films or a heat-sealing and moisture-proofing composition for application to cellophane, the parts being given by weight.

EXAMPLE A

A composition was prepared containing the following ingredients:

| | Parts |
|---|---|
| Nitrocellulose | 30 |
| Paraffin, melting point 67° C | 5 |
| Dibenzoate of N,N'-bis-(beta-hydroxyethyl)-terephthalamide | 28 |
| Dammar gum | 30 |
| Dibutyl phthalate | 7 |

One part of the composition was dissolved in twenty-five parts of a solvent consisting of 15 parts ethyl acetate, 15 parts butyl acetate and 70 parts toluene. A sheet of cellophane was coated with the mixture and allowed to dry. The resulting coated sheet was moisture-proof and remained flexible.

EXAMPLE B

A composition was prepared containing the following ingredients:

| | Parts |
|---|---|
| Nitrocellulose | 50 |
| Paraffin, melting point 67° C | 5 |
| Tetra-(m-chlorobenzoate) of N,N'-tetra-(beta-hydroxyethyl)-terephthalamide | 40 |
| Ester gum | 5 |

One part of the composition was dissolved in twenty parts of the solvent of Example A. The resulting mixture was applied to a sheet of cellophane and the sheet was allowed to dry. The sheet was flexible and moisture-proof.

It is to be understood that changes and variations may be made without departing from the spirit and scope of the invention as defined in the appended claims.

I claim:

1. A composition of matter comprising (1) an organic plastic film-forming material selected from the group consisting of thermoplastic resins, thermoplastic cellulose esters and ethers, thermosetting resins, mixtures of thermoplastic and thermosetting resins and (2) as a plasticizer a compound having the formula

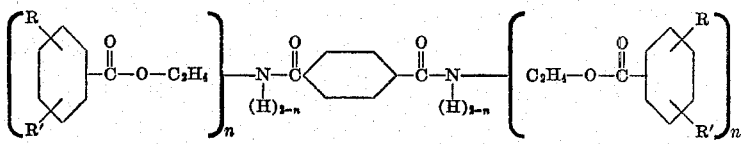

where $n$ is 1 or 2 and R and R' are selected from the group consisting of hydrogen, halogen and alkyl groups of 1 to 6 carbon atoms, the film-forming material being present in a proportion of 40 to 95% by weight of the total solids in the composition and the plasticizer being present in a proportion of 5 to 45% by weight of the total solids.

2. Composition of claim 1 wherein the plasticizer is the dibenzoate of N,N'-bis-(beta-hydroxyethyl)-terephthalamide.

3. Composition of claim 1 wherein the plasticizer is tetrabenzoate of N,N'-tetra-(beta-hydroxyethyl)-terephthalamide.

4. Composition of claim 1 wherein the plasticizer is the tetra-(m-chlorobenzoate) of N,N'-tetra-(beta-hydroxyethyl)-terephthalamide.

5. Composition of claim 1 wherein the plasticizer is di-(p-ethylbenzoate) of N,N'-bis-(beta-hydroxyethyl)-terephthalamide.

6. Composition of claim 1 wherein the plasticizer is diphenylacetate of N,N'-bis-(beta-hydroxyethyl)-terephthalamide.

References Cited in the file of this patent

UNITED STATES PATENTS

| 2,487,106 | Cornwell | Nov. 8, 1949 |
| 2,552,321 | Jayne et al. | May 8, 1951 |